United States Patent

Verhoef

Patent Number: 5,878,653
Date of Patent: Mar. 9, 1999

[54] APPARATUS FOR PREPARING AND POURING EXTRACTION BEVERAGES

[75] Inventor: Kees Verhoef, Sliedrecht, Netherlands

[73] Assignee: Veromatic International B.V., Dordrecht, Netherlands

[21] Appl. No.: 809,993

[22] PCT Filed: Oct. 20, 1995

[86] PCT No.: PCT/NL95/00368

§ 371 Date: Apr. 11, 1997

§ 102(e) Date: Apr. 11, 1997

[87] PCT Pub. No.: WO96/12432

PCT Pub. Date: May 2, 1996

[30] Foreign Application Priority Data

Oct. 24, 1994 [NL] Netherlands ............................ 9401763

[51] Int. Cl.⁶ .................................................. A47J 31/32
[52] U.S. Cl. ........................ 99/287; 99/289 T; 99/302 R
[58] Field of Search ................................. 99/287, 289 T, 99/298, 303, 302 R

[56] References Cited

U.S. PATENT DOCUMENTS 5,197,373  3/1993  De Jong ............................ 99/289 T X
5,297,472  3/1994  Suzuki et al. ........................ 99/289 T
5,309,820  5/1994  Baxter et al. ..................... 99/289 T X

FOREIGN PATENT DOCUMENTS 0 483 244   11/1994   European Pat. Off. .
WO/91/01673  2/1991   WIPO .

Primary Examiner—Reginald L. Alexander
Attorney, Agent, or Firm—Foley & Lardner

[57] ABSTRACT

An apparatus for brewing and pouring coffee or tea in unit doses has an upwardly and downwardly moveable extraction chamber, a filter unit with an exchangeable filter, and a collection chamber. The collection chamber is covered at the top by a grating, which abuts the filter paper, and is closed at the bottom by an impermeable membrane, which is coupled to a displacement mechanism that moves the membrane up and down. A pouring-out tube is connected to the underside, and it is closed by a valve. During a working cycle, in a first phase, hot water and coffee or tea are introduced in the extraction chamber; in a second phase, the membrane moves up, pressing air through the filter into the extraction chamber; in a third phase, the membrane moves downwardly, suctioning extract brewed in the extraction chamber through the filter into the collection chamber; and in a fourth phase, the valve is opened and the brewed coffee or tea is poured through the tube.

4 Claims, 4 Drawing Sheets

APPARATUS FOR PREPARING AND POURING EXTRACTION BEVERAGES

BACKGROUND OF THE INVENTION

1. Field of the Invention

The invention relates to an apparatus for preparing and pouring unit doses of extraction beverages such as coffee or tea, comprising a filter unit with means for advancing a strip of filter paper over a fixed filter position, an upwardly and downwardly moveable extraction chamber, located above the filter position, with an at least partly open bottom, and provided at the topside with supply means for supplying doses of extraction agent, such as ground coffee or tea, and hot water, a collection chamber fixedly located under the filter position, of which the open top side, which is covered by a grating or perforated plate abuts the filter paper on the filter position, and to which a pouring spout, provided with a valve, is connected at the underside, a pressure control means for regulating the air pressure in the collection chamber, and driving means for driving the apparatus in a coordinated way for performing a working cycle, in which in a first phase, during which the bottom edge of the extraction chamber is pressed against the filter position and extraction agent and hot water are introduced in the extraction chamber through the respective feeds, in a second phase air is pressed from the collection chamber through the filter paper into the extraction chamber, in a third phase the brewed extract is suctioned through the filter paper to the collection chamber, and in a fourth phase the valve of the pouring spout is opened, the extraction chamber is moved upwards, and the strip of filter paper is advanced.

2. Description of Related Art

Such apparatus are known and are used in particular as automatic coffee or tea vending machines and are generally part of more extensive automatic beverage dispensers, from which other beverages also are available.

Such an apparatus is known from several publications, including international application WO-A-91/01673. In this known device the air pressure in the collection chamber is regulated by a driven double action pump, of which the pump line is connected to the side wall of the collection chamber above the highest level attainable by the extraction fluid suctioned into it. There is a fluid outlet at the centre of the bottom of the collection chamber, which serves as a pouring spout and which is provided with a valve.

In this known device an electronic circuit ensures that the various elements can work in a coordinated manner. For preparing a cup of extraction beverage, e.g. a cup of coffee, when the extraction chamber is pressed against the filter, and coffee grindings and hot water have been provided therein, the pump is switched to blowing, in which air is blown into the collection chamber, which, as a result of the overpressure created, penetrates through the filter into the extraction chamber and thereby causing an advantageous mixing action, by which extraction agent (coffee) and hot water contact each other intimately, which allows a good extraction.

After this extraction phase the pump is switched to suctioning, by which, as a result of the underpressure created in the collection chamber, the extraction fluid is suctioned from the extraction chamber through the filter into the collection chamber. Finally, the last phase occurs, in which the valve of the pouring spout is opened and the coffee is poured.

This known device functions well and purposively for providing unit doses of extraction beverages such as coffee, but has the disadvantage that the double action pump is an expensive element, and further that it is expensive in terms of power consumption. There is further the possibility that the extraction fluid, drawn through the filter during the suctioning phase, is being suctioned partly into the pump line when coming down, which entails a risk of damaging the expensive pump installation.

SUMMARY OF THE INVENTION

The object of the invention is to provide an apparatus as described in the preamble by which the stated disadvantages are avoided.

To that end the apparatus for preparing and pouring unit doses of extraction beverages according to the invention is characterized in that the collection chamber widens conically in downward direction with an open bottom, which is sealed by an impermeable, supple membrane, attached fixedly to the bottom edge, and connected at its centre to a connecting member, that the connecting member is connected to a lever arm, driven by the driving means for an upward or downward movement of the membrane in and out of the collection chamber for regulating the pressure therein, and that the pouring spout is connected to said connecting member, and the valve of the pouring spout is attached to the underside of the connecting member, which valve is normally closed and opens in the lowest position of the connecting member.

By moving the membrane up and down the necessary underpressure or overpressure in the collection chamber can, by the resulting increase or decrease in volume of the collection chamber, be brought to function such that when the membrane moves up, thus in the collection chamber, air is pressed from the collection chamber through the filter into the extraction chamber, by which the above mentioned mixing action of the mixture of hot water and extraction agent located in the extraction chamber can occur effectively as a result of the rising air. Conversely, if the membrane moves down or, as the case may be, out of the uptake chamber space, then the underpressure, created as a result of an increase in volume, causes the extraction fluid to be drawn through the filter into the collection chamber in the same way as with the apparatus according to WO-A-91/01673, in order to be finally poured out. There are no special requirements as regard to the membrane. It is only necessary that the membrane is fluid impermeable and sufficiently strong. It is not necessary for the functioning of the membrane that the membrane has to be elastic. Such membranes may be made of suitable plastic materials such as polyethylene in suitable layer thicknesses.

To obtain an action as effective as possible the collection chamber widens conically in downward direction. This allows for displacement of the membrane upwards or downwards to ensure the largest possible change in volume of the collection chamber, by which the pumping action or suctioning action thereof is improved.

In accordance with the invention the membrane is connected at its centre section to a connecting member to which the pouring spout is connected. There is also a lever arm connected to this connecting member for an upward or downward movement of the connecting member and membrane. This embodiment entails an appreciable reduction in terms of components since, on the other hand, the connecting member provides for the transmission of power from the lever arm to the membrane and thereby protects the membrane against damage while, on the other hand, the pouring function via the pouring spout can take place through it. In this the embodiment is such that the valve of the pouring member is attached to the underside of the connecting member, which valve is normally closed and opens in the lowest position of the connecting member, in which position during operation the extraction fluid is drawn through the filter to the collection chamber.

It is noted that the principle of increase or decrease of the volume for generating underpressure or overpressure in the collection chamber of an apparatus is already known from U.S. Pat. No. 3,565,641. In this known device the collection chamber is in fact a piston cylinder, in which a pump cylinder is movable to and fro. Here too, air is pressed through the filter into the extraction chamber by thrusting the cylinder upwards, and underpressure sufficient to be able to draw the extraction fluid from the extraction chamber into the piston cylinder, is generated by moving the piston downwards. When the piston reaches below a certain height during the downward stroke thereof, it passes the opening of a pouring spout, so that the brewed fluid may be poured through it. The piston is further purposively connected to a rod which moves to and fro, which—through a crank arm—can perform a complete working cycle.

This known device, however, has the disadvantage that the piston needs to fit closely in the cylinder in order to prevent leaks as a result of which there is considerable piston wear, resulting in that abrasive particles will come into the beverage to be poured. Furthermore, the drive of the piston is relatively heavy as a result of the relatively close fit, thus requiring a relatively high powered driving engine.

Contrary thereto, the invention can be worked with a low power driving engine, and there is no probability at all of contaminating the beverage to be poured as a result of abrasive particles or suchlike.

According to GB-A-2 266 228 a concertina bellows is used in a beverage dispenser for drawing and pressing hot water through a closed tea of coffee bag of filter paper. Said apparatus is operated in a two-phase cycle where in the first phase the bellows is expanded and draws hot water through the tea of coffee bag into the expanded bellows, and in the second phase is compressed, pressing the obtained hot brew back through the bag to a pouring outlet. In the embodiment of FIG. 3 the bellows is located below the filter position. Contrary to U.S. Pat. No. 3,565,641 and the present invention the apparatus has no brewing chamber. Furthermore the operation cycle involves no special phase for pressing air into the brew.

Such a concertina bellows could possibly replace the piston cylinder system of the apparatus of U.S. Pat. No. 3,565,641; however, in that case there would be hygienic problems because of contamination in the valves of the bellows. Other disadvantages would be the relative big size of the expanded bellows and the inevitable noxious space in the bellows. In the present invention, using a single membrane, such problems are avoided.

According to a preferred embodiment of the invention the pouring member is formed by a tube of flexible, elastic plastic material, and the valve comprises a clamp roller connected to a hinge lever biased by a spring, which keeps the clamp roller pressed in a certain position in which the tube is pinched off, and a bumper edge is provided below the connecting member, against which the free end of the hinge lever in the lowest position of the connecting member is pressed counter to the spring force, by which the clamp roller releases the tube. By this the opening and closing of the valve is combined in a very simple way with the upward and downward movement of the connecting member and membrane, by which a working cycle can be performed during one to and fro movement of the connecting member with the membrane, whereby the pouring spout is opened or closed at the right moment.

For the required to and fro movement the embodiment may be such that the lever arm connected to the connecting member for an upward and downward movement, is eccentrically coupled to a drive axle, of which a circular stroke comprises a total working cycle of the apparatus. To this end the lever arm connected to the connecting member may be effectively coupled through a crank rod to the drive axle.

BRIEF DESCRIPTION OF THE DRAWINGS

The invention will now be described further with reference to the drawings, in which.

DETAILED DESCRIPTION OF THE PREFERRED EMBODIMENTS

Figure 1:
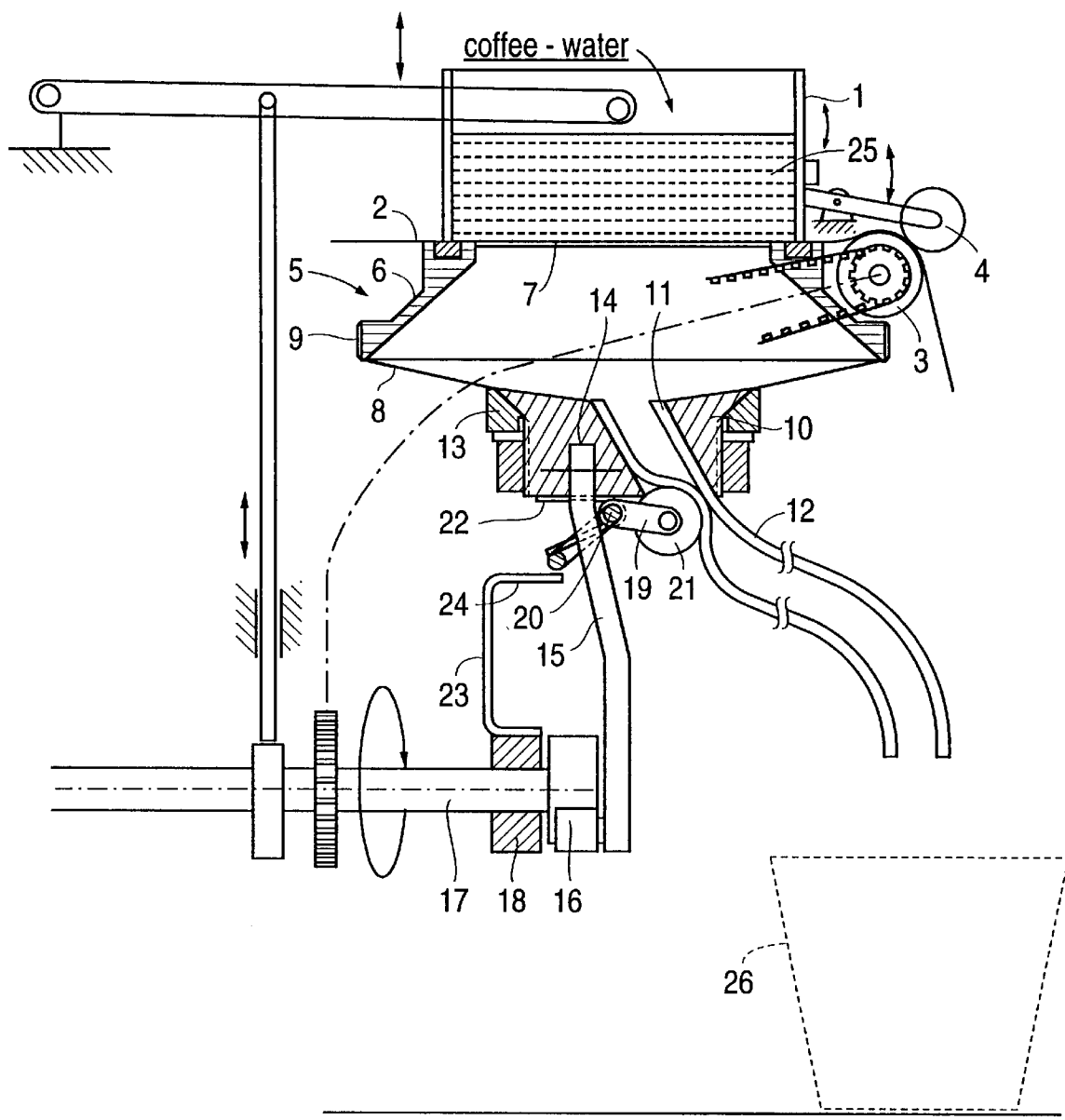
FIG. 1 is a cross sectional view of an embodiment of an apparatus according to the invention, in particular destined for brewing and pouring out coffee in doses, in which the apparatus is shown during a first phase of a working cycle.

The apparatus depicted in FIGS. 1–4 is in particular destined for brewing and pouring out coffee in a dosis quantity, for example a cup. The apparatus has an extraction chamber 1 with means for feeding ground coffee and hot water (indicated schematically). There is a filter strip 2 of suitable filter paper under the extraction chamber. This filter strip is driven by a drive mechanism, indicated schematicaly by a drive roller 3 and a counter roller 4, with the filter strip lying inbetween. The extraction chamber 1 is movable upwards and downwards by means of suitable raising means (not shown).

There is a collection chamber below the filter strip, indicated generally with reference 5, which has a side wall 6, which widens conically in downward direction, in the shape of an inverted funnel. There is a grating or perforated plate 7 at the open top side of this inverted funnel 6, with the filter paper lying above this. The inverted funnel 6 is closed at the bottom by a membrane 8, which is made of flexible plastic and which is impermeable. This membrane is attached on the outside around the lower edge 9 of the inverted funnel 6, and attached at its centre to a connecting member 10, which has a thorough connection opening 11 at the centre, in which a plastic discharge tube 12 is inserted, forming the pouring spout of the apparatus. A screw ring 13, which clamps the membrane, serves to fix the membrane 8 onto the connecting member 10.

The connecting member further has a blind assembly opening 14, in which a lever arm 15 is assembled. This lever arm 15 is hingedly connected at its bottom end to a crank arm 16, which is fixedly attached to a horizontal drive axle 17 behind a bearing block 18 of this drive axle. The drive axle 17 is driven by a drive motor (not shown), which can also provide for the driving of the paper strip, and e.g. is coupled to the drive axle 17 by means of a chain transmission (not shown).

There is a hinging angle lever 19 attached via a hinge point 20 below the connecting member 19. This angle lever has at its one end which faces the discharge tube 12, a hinging clamp roller 21 connected to it, which clamps the plastic tube 12 - mounted obliquely in the connecting member 10—by means of the bias of a spring 22 and by this keeping it closed. Furthermore, above the bearing block 18 for the drive axle 17 there is an upright rod 23, of which the flanged upper part 24 forms a buffer edge against which the free end of the hinging angle lever 19 is pressed when the closure member goes down, by which the clamp roller 21 comes off the plastic tube 12, so that the latter is opened.

When using the apparatus described above, a complete working cycle is performed during one complete rotation of the drive axle, in which a cup or another unit dosis of coffee is brewed and poured out. Successive phases of this working cycle are illustrated in—in succession—FIGS. 1, 2, 3 and 4. The drive axle 17 rotates during all these phases.

Figure 4:
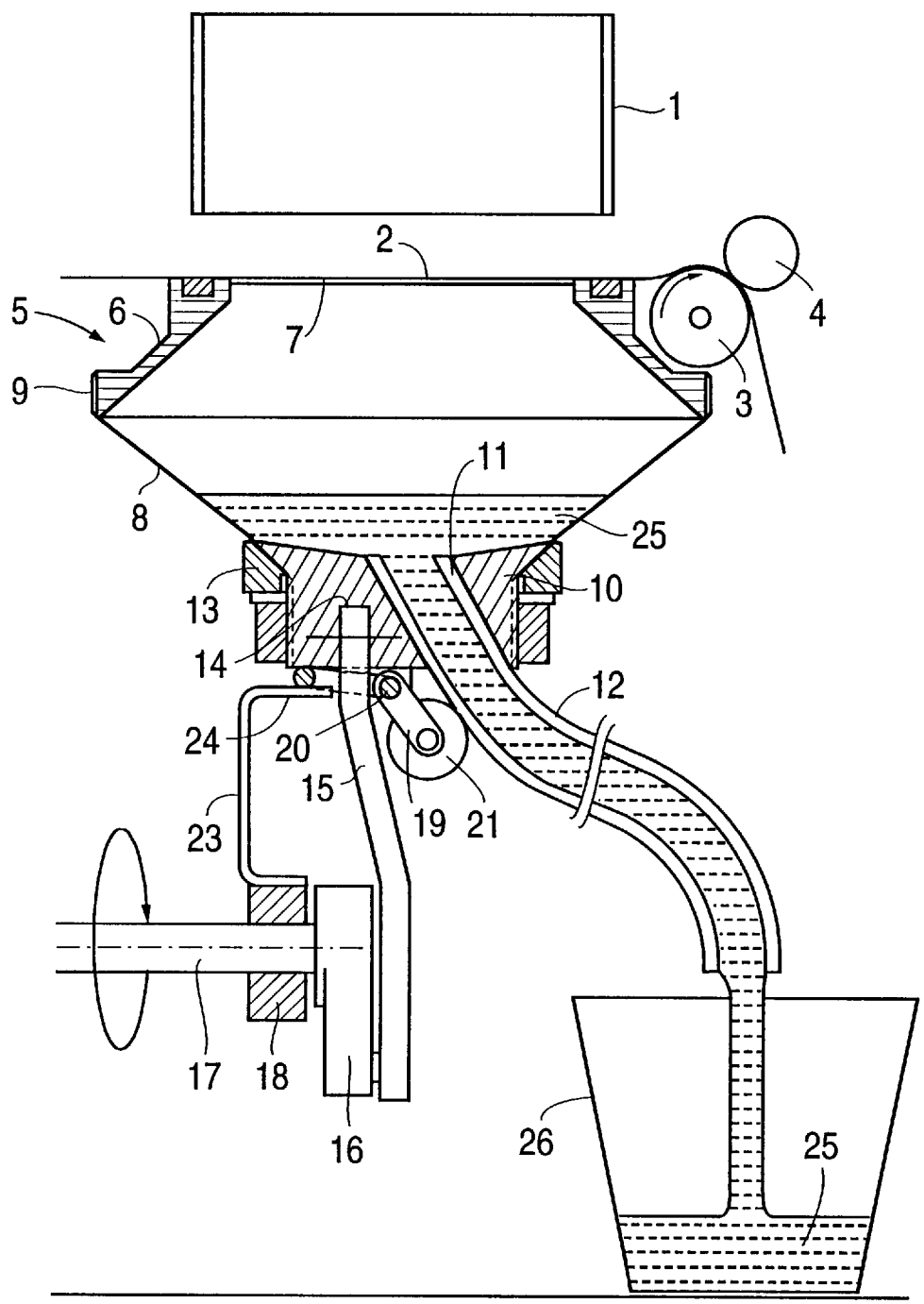
FIG. 4 is a view of the same apparatus during a fourth phase of the working cycle.

In the first phase, illustrated in FIG. 4, crank arm 16 is positioned in an obliquely forward position and extraction chamber 1 is in its lowest position, the bottom edge thereof being pressed against filter strip 2, which in this phase is not driven, above the top edge of the inverted funnel 6, so that the filter is clamped between the bottom edge of extraction chamber 1 and the top edge of collection chamber 5. During this phase coffee and hot water are supplied in doses, while crank arm 16 slowly rotates upwards, guided by the continuously rotating drive axle.

Figure 2:
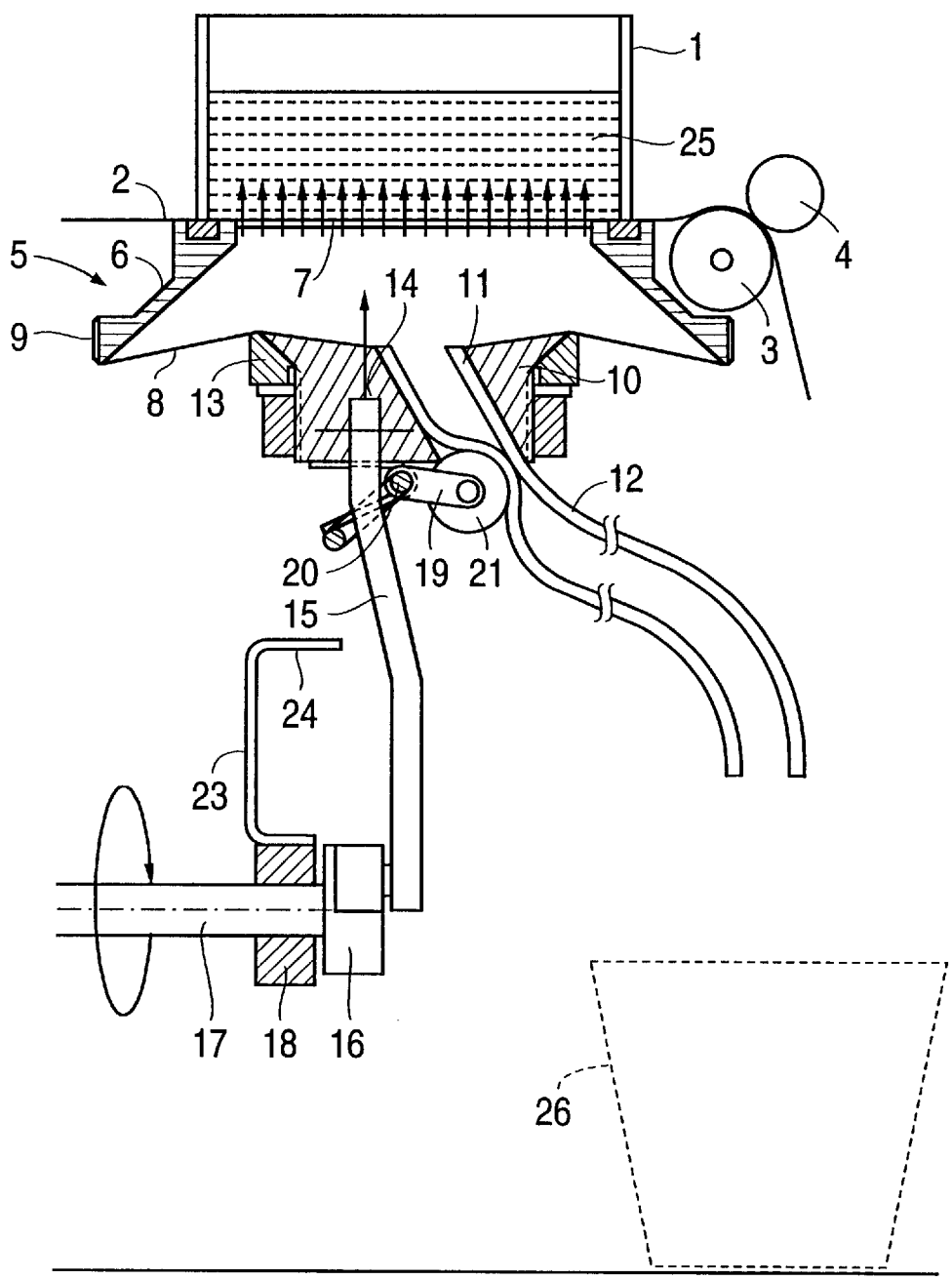
FIG. 2 is a view of the same apparatus during a second phase of the working cycle.
Figure 3:
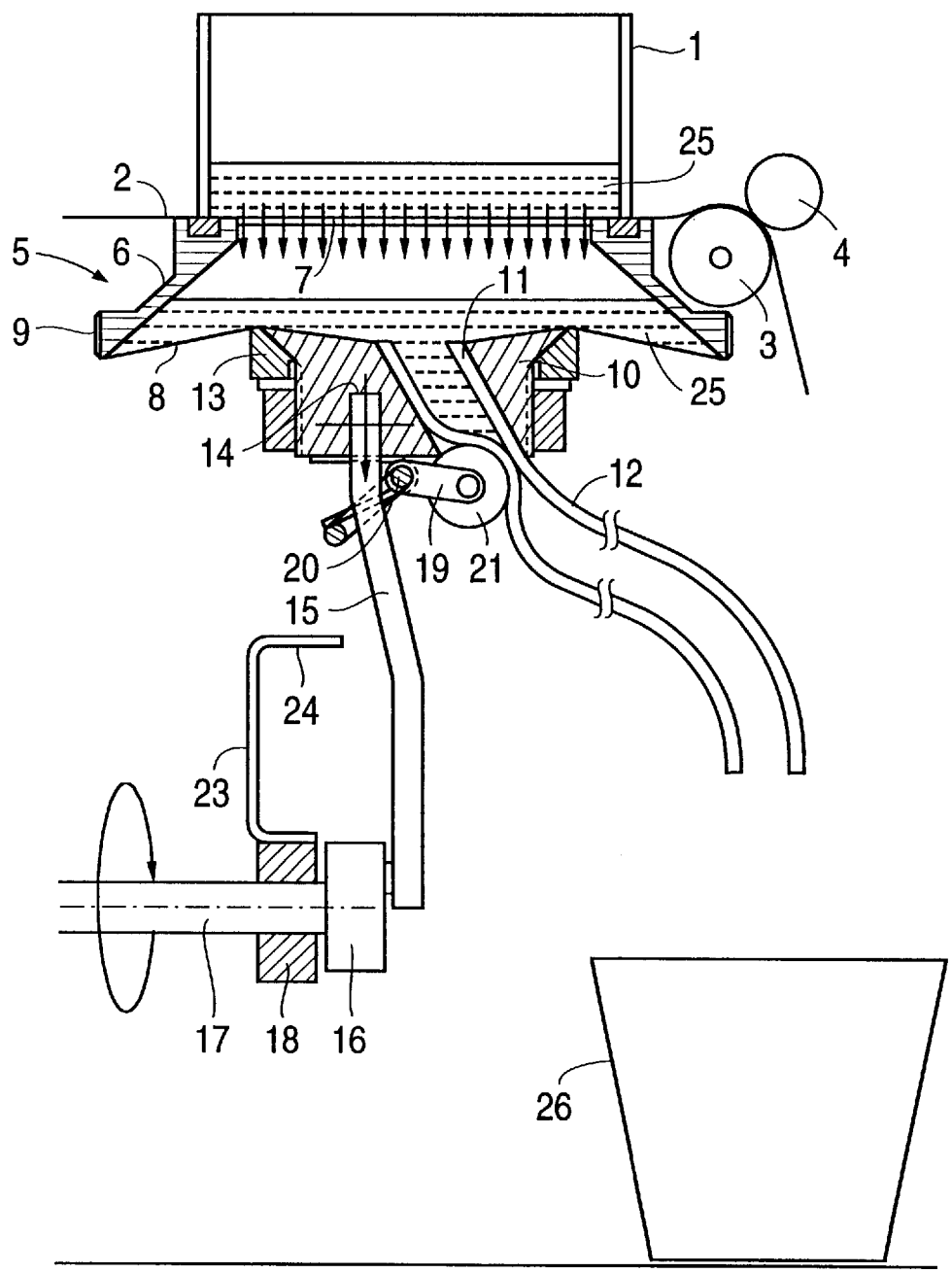
FIG. 3 is a view of the same apparatus during a third phase of the working cycle.

Consequently the membrane is pressed upwards in phase 2, illustrated in FIG. 2, and air is pressed through filter 2 into the mixture of hot water and ground coffee, by which the mixture undergoes a stirring action that ensures that the coffee is properly brewed.

During phase 3, when crank arm 16 has passed its highest position, membrane 8 is pulled down again, creating a suction action that ensures that the hot coffee extract 25, formed in the extraction chamber, is drawn through filter 2 and grating 7 into collection chamber 5. During the above described three phases of the working cycle the pouring spout—formed by plastic tube 12—is closed because it is kept pinched by the resilient force of spring 22, which keeps clamp roller 21 pressed against tube 12.

Finally, in the fourth phase illustrated in FIG. 4, by further pulling down membrane 8, the lowest position of crank arm 16 is reached, whereby closure member 10 has been brought down so low that the free end of hinging angle lever 19 is pressed against buffer edge 24, by which clamp roller 21 comes off plastic tube 21 and opens it, and the coffee extract 25 is poured out through the tube into a cup 26 placed underneath it. At the same time extraction chamber 1 rises and the drive mechanism 3, 4 ensures that filter strip 2 is advanced and that the used filter paper is replaced by clean filter paper, ready for use in the following cycle.

The invention has been described in the foregoing by way of an example of an embodiment. It will be obvious that the invention is not limited to this sole embodiment but that numerous variations with regard to the construction are possible, all of them operating according to the same principle as the one stated hereinabove. Furthermore, the invention is not limited to coffee only, but also other extraction beverages—e.g. tea or cocoa—may be used. When incorporated in an automatic coffee or beverage dispenser, further usual provisions for sugar, milk, etc. are available. Given the foregoing, all these further aspects will be clear to the skilled person.

What is claimed is:

1. Apparatus for preparing and pouring unit doses of extraction beverages such as coffee or tea, comprising a filter unit having a strip of filter paper adapted to be advanced over a fixed filter position, an upwardly and downwardly moveable extraction chamber, located above the filter position, with an at least partly open bottom, and provided at the topside with suppliers supplying doses of extraction agent, such as ground coffee or tea, and hot water, a collection chamber fixedly located under the filter position and having an open top side that is covered by a grating or perforated plate that abuts the filter paper at the filter position, and to which a pouring spout having a valve is connected at the underside, a pressure controller regulating air pressure in the collection chamber, and a driving system moving the extraction chamber upward and downward and advancing the filter strip in a coordinated way for performing a working cycle, in which pressing the bottom edge of the extraction chamber against the filter position and introducing extraction agent and hot water in the extraction chamber through the respective suppliers, pressing air from the collection chamber through the filter paper into the extraction chamber, suctioning brewed extract through the filter paper to the collection chamber, and opening the valve of the pouring spout, moving the extraction chamber upwards, and advancing the strip of filter paper, wherein the collection chamber widens conically in the downward direction with an open bottom, which is sealed by an impermeable, supple membrane attached fixedly to the bottom edge and connected at its center to a connecting member, and wherein the connecting member is connected to a lever arm, driven by the driving system in an upward or downward movement of the membrane in and out of the collection chamber for regulating the pressure therein, and wherein the pouring spout is connected to said connecting member, and the valve of the pouring spout is attached to the underside of the connecting member, the valve being normally closed and opening at the lowest position of the connecting member.

2. Apparatus according to claim 1, characterized in that the pouring spout is formed by a tube of flexible, elastic plastic material, and that the valve comprises a clamp roller, connected to a hinge lever biased by a spring, which keeps the clamp roller pressed in a certain position, in which the tube is pinched off, and a bumper edge is provided below the connecting member, against which the free end of the hinge lever in the lowest position of the connecting member is pressed counter to the spring force, by which the clamp roller releases the tube.

3. Apparatus according to claim 1, characterized in that the lever arm, connected to the connecting member for an upward and downward movement, is eccentrically coupled to a drive axle, of which a circular stroke comprises a total working cycle of the apparatus.

4. Apparatus according to claim 3, characterized in that the lever arm connected to the connecting member is coupled through a crank arm to the drive axle.

* * * * *